United States Patent
Sawada et al.

(10) Patent No.: US 7,792,523 B2
(45) Date of Patent: Sep. 7, 2010

(54) MESSAGE TRANSMISSION SYSTEM AND MESSAGE TRANSMISSION METHOD

(75) Inventors: Hisanori Sawada, Sendai (JP); Ayumi Eguchi, Fukuoka (JP); Kayo Kobayashi, Hatogaya (JP); Hidenori Miyamoto, Saitama (JP); Tooru Nasu, Tokyo (JP); Hiroki Yamaguchi, Fukuoka (JP)

(73) Assignee: NTT DoCoMo, Inc., Tokyo (JP)

( * ) Notice: Subject to any disclaimer, the term of this patent is extended or adjusted under 35 U.S.C. 154(b) by 624 days.

(21) Appl. No.: 11/631,612

(22) PCT Filed: Jun. 30, 2005

(86) PCT No.: PCT/JP2005/012087

§ 371 (c)(1),
(2), (4) Date: Sep. 26, 2007

(87) PCT Pub. No.: WO2006/003995

PCT Pub. Date: Jan. 12, 2006

(65) Prior Publication Data

US 2008/0032717 A1    Feb. 7, 2008

(30) Foreign Application Priority Data

Jul. 6, 2004    (JP) .............................. 2004-199772

(51) Int. Cl.
*H04Q 7/20*    (2006.01)
(52) U.S. Cl. ................. 455/422.1; 455/435.1; 455/466; 370/401; 709/232
(58) Field of Classification Search .............. 455/422.1, 455/435.1, 466; 370/401; 709/232
See application file for complete search history.

(56) References Cited

U.S. PATENT DOCUMENTS

| | | | |
|---|---|---|---|
| 5,459,775 A * | 10/1995 | Isono et al. | 379/93.15 |
| 5,898,915 A | 4/1999 | Reininghaus et al. | |
| 6,044,259 A | 3/2000 | Hentilae et al. | |
| 7,320,026 B2 * | 1/2008 | Adamczyk | 709/219 |
| 2002/0073343 A1 | 6/2002 | Ziskind et al. | |

(Continued)

FOREIGN PATENT DOCUMENTS

JP    05-284255    10/1993

(Continued)

OTHER PUBLICATIONS

U.S. Appl. No. 11/631,861, filed Jan. 8, 2007, Sawada, et al.

*Primary Examiner*—Danh C Le
(74) *Attorney, Agent, or Firm*—Oblon, Spivak, McClelland, Maier & Neustadt, L.L.P.

(57) ABSTRACT

A message transmission system includes a registration accepting part for accepting a membership number, a subscriber telephone number, and a subscribed service ID; a subscriber information storage for storing membership numbers, subscriber telephone numbers, and subscribed service IDs in association with each other; a transmission request receiver for receiving a membership number of a message destination and a service ID of a Web server from the Web server or from communication terminal; a communication address converter for referring to the subscriber information storage on the basis of the received membership number and service ID to retrieve the subscriber telephone number corresponding to the membership number and service ID; and a message output part for outputting a predetermined message while designating the retrieved subscriber telephone number.

3 Claims, 9 Drawing Sheets

U.S. PATENT DOCUMENTS

| | | |
|---|---|---|
| 2002/0176405 A1 | 11/2002 | Aijala |
| 2003/0073426 A1 | 4/2003 | Chan et al. |
| 2003/0158812 A1 | 8/2003 | Engelhart |
| 2003/0227899 A1* | 12/2003 | McCann ..................... 370/349 |
| 2004/0024823 A1 | 2/2004 | Del Monte |
| 2004/0048615 A1* | 3/2004 | Kato et al. ............... 455/435.1 |
| 2004/0076154 A1* | 4/2004 | Mizutani et al. ............ 370/389 |
| 2004/0088546 A1 | 5/2004 | Shah et al. |
| 2005/0108417 A1* | 5/2005 | Haumont .................... 709/232 |
| 2005/0141552 A1* | 6/2005 | Schwalb ..................... 370/466 |
| 2005/0195792 A1* | 9/2005 | Baik ......................... 370/349 |
| 2006/0068797 A1 | 3/2006 | Iinuma et al. |
| 2006/0080396 A1 | 4/2006 | Enatsu et al. |

FOREIGN PATENT DOCUMENTS

| | | |
|---|---|---|
| JP | 2000 305874 | 11/2000 |
| JP | 2001 188724 | 7/2001 |
| JP | 2001-510603 | 7/2001 |
| JP | 2001 282651 | 10/2001 |
| JP | 2003-187143 | 7/2003 |
| JP | 2003-233566 | 8/2003 |
| JP | 2003-249964 | 9/2003 |
| JP | 2003-264858 | 9/2003 |
| JP | 2003-348158 | 12/2003 |
| JP | 2004-104559 | 4/2004 |
| JP | 2004-193764 | 7/2004 |
| JP | 2005-216249 | 8/2005 |
| WO | WO 2004/053703 A1 | 6/2004 |

* cited by examiner

Fig.2

| SUBSCRIBER INFORMATION || SUBSCRIBED OBJECT SERVICE ID |
|---|---|---|
| SUBSCRIBER TELEPHONE NUMBER | MEMBERSHIP NUMBER | |
| 090-XXXX0001 | MEM001 | 6789 |
| | MEM099 | 8901 |
| | ⋮ | ⋮ |
| 090-XXXX0002 | ID0001 | 9012 |
| ⋮ | ⋮ | ⋮ |

Fig.4

| SERVICE PROVIDER ID | TRANSMISSION RESTRICTION FLAG 1 | SERVICE PROVIDER NAME | SERVICE ID | PASSWORD | SERVICE NAME | SERVICE START DATE | SERVICE END DATE | TRANSMISSION RESTRICTION FLAG 2 |
|---|---|---|---|---|---|---|---|---|
| 12345 | 1 | A BANK | 6789 | XXXX | SERVICE A | 2004/9/1 | 2004/10/1 | 1 |
| | | | 7890 | YYYY | SERVICE B | 2004/5/1 | 2004/9/1 | 0 |
| 34567 | 0 | B TRADING | 8901 | ZZZZ | SERVICE C | 2004/12/1 | 2005/12/31 | 0 |
| | | | 9012 | WWWW | SERVICE D | 2004/12/1 | 2005/12/31 | 0 |
| ... | ... | ... | ... | ... | ... | ... | ... | ... |

Fig.7

(a)
```
<HTML>
<HEAD>
<TITLE>{Subject}</TITLE>          D01
</HEAD>
<BODY>
MESSAGE FROM {Service Name}. <BR>
{Body} <BR>
DETAILS ARE AVAILABLE FROM <A HREF="http://xxxx"> SITE A </A> <BR>
</BODY>                                    D04
</HTML>
```
D02 — {Body}
D03 — MESSAGE FROM {Service Name}

(b)
```
<HTML>
<HEAD>
<TITLE>Site Renewal</TITLE>
</HEAD>
<BODY>
MESSAGE FROM SERVICE A. <BR>
OUR SITE IS REDESIGNED. <BR>
DETAILS ARE AVAILABLE FROM <A HREF="http://xxxx"> SITE A </A> <BR>
</BODY>
</HTML>
```

MESSAGE TRANSMISSION SYSTEM AND MESSAGE TRANSMISSION METHOD

TECHNICAL FIELD

The present invention relates to a message transmission system and message transmission method for transmitting a message through a communication network.

BACKGROUND ART

A method of transmitting message data via a server such as a mail server connected to a communication network is commonly used as a method of electronically transmitting a message through a communication network. An example of such technology is an e-mail system described in Japanese Patent Application Laid-Open No. 2000-305874. This e-mail system is configured to extract address information from a mail file, to convert the address information into a mail address, and to request a mail server to transmit a mail message.

DISCLOSURE OF THE INVENTION

In the conventional e-mail system as described above, a mail sender designates the address information corresponding to a mail address of a mail destination, in the form of a character string, and it is thus necessary to preliminarily register conversion information from the character string to the mail address in the e-mail system. However, where there exists more than one mail sender, there is a possibility that the same address information is used for different mail addresses, and it becomes difficult to uniquely specify the destination mail address of e-mail. It is also possible for a mail sender to transmit a mail message to an unspecified number of destinations by, for example, designating address information at random, which will result in inducing nuisance mail.

The present invention has been accomplished in view of this problem, and an object of the invention is to provide a message transmission system and message transmission method capable of securely transmitting a message to an address designated by a sender and restricting a message destination on a sender-by-sender basis.

In order to solve the above problem, a message transmission system of the present invention comprises registration accepting means for accepting first communication terminal specifying information specifying a communication terminal, second communication terminal specifying information specifying a communication address of the communication terminal, and subscribed service specifying information specifying a service to which the communication terminal subscribes; subscriber information storing means for storing the first communication terminal specifying information, the second communication terminal specifying information, and the subscribed service specifying information in association with each other; transmission request receiving means for receiving third communication terminal specifying information specifying a communication terminal of a message destination, and provided service specifying information specifying a service provided by a message sender, from a message sender equipment; communication address converting means for referring to the subscriber information storing means on the basis of the third communication terminal specifying information and the provided service specifying information received by the transmission request receiving means, to retrieve the second communication terminal specifying information corresponding to the first communication terminal specifying information agreeing with the third communication terminal specifying information, and the subscribed service specifying information agreeing with the provided service specifying information; and message outputting means for outputting a predetermined message while designating the second communication terminal specifying information retrieved by the communication address converting means, as a communication address.

Another aspect of the present invention is a message transmission method comprising: a registration accepting step wherein registration accepting means accepts first communication terminal specifying information specifying a communication terminal, second communication terminal specifying information specifying a communication address of the communication terminal, and subscribed service specifying information specifying a service to which the communication terminal subscribes; a subscriber information storing step wherein subscriber information storing means stores the first communication terminal specifying information, the second communication terminal specifying information, and the subscribed service specifying information in association with each other; a transmission request receiving step wherein transmission request receiving means receives third communication terminal specifying information specifying a communication terminal of a message destination, and provided service specifying information specifying a service provided by a message sender, from a message sender equipment; a communication address converting step wherein communication address converting means refers to the subscriber information storing means on the basis of the third communication terminal specifying information and the provided service specifying information received by the transmission request receiving means, to retrieve the second communication terminal specifying information corresponding to the first communication terminal specifying information agreeing with the third communication terminal specifying information, and the subscribed service specifying information agreeing with the provided service specifying information; and a message outputting step wherein message outputting means outputs a predetermined message while designating the second communication terminal specifying information retrieved by the communication address converting means, as a communication address.

The message transmission system and message transmission method described above are configured to preliminarily accept the first communication terminal specifying information specifying a communication terminal, the second communication terminal specifying information specifying a communication address of the communication terminal, and the subscribed service specifying information specifying a service to which the communication terminal subscribes, and to store those information items in association with each other in the subscriber information storing means. When the transmission request receiving means receives the third communication terminal specifying information specifying a communication terminal of a destination and the provided service specifying information from the message sender equipment, the communication address converting means refers to the subscriber information storing means to retrieve the second communication terminal specifying information corresponding to the received third communication terminal specifying information and provided service specifying information, thereby outputting the message using the second communication terminal specifying information as a communication address. This makes it feasible to transmit the message more securely to the communication terminal intended by the message sender by converting the communication terminal specifying information managed for each service provided by the message sender, into the communication address, and to limit the message destination for each message sender.

BRIEF DESCRIPTION OF THE DRAWINGS

FIG. 2 is a diagram showing a configuration of data stored in a subscriber information storage shown in FIG. 1.

FIG. 4 is a diagram showing a configuration of data stored in an authentication information storage shown in FIG. 1.

FIG. 7 (a) is a diagram showing a content of a template for a conversion process by a message converter shown in FIG. 1, and FIG. 7 (b) is a diagram showing a content of transmitting message data resulting from the conversion by the message converter shown in FIG. 1.

BEST MODES FOR CARRYING OUT THE INVENTION

Figure 1:
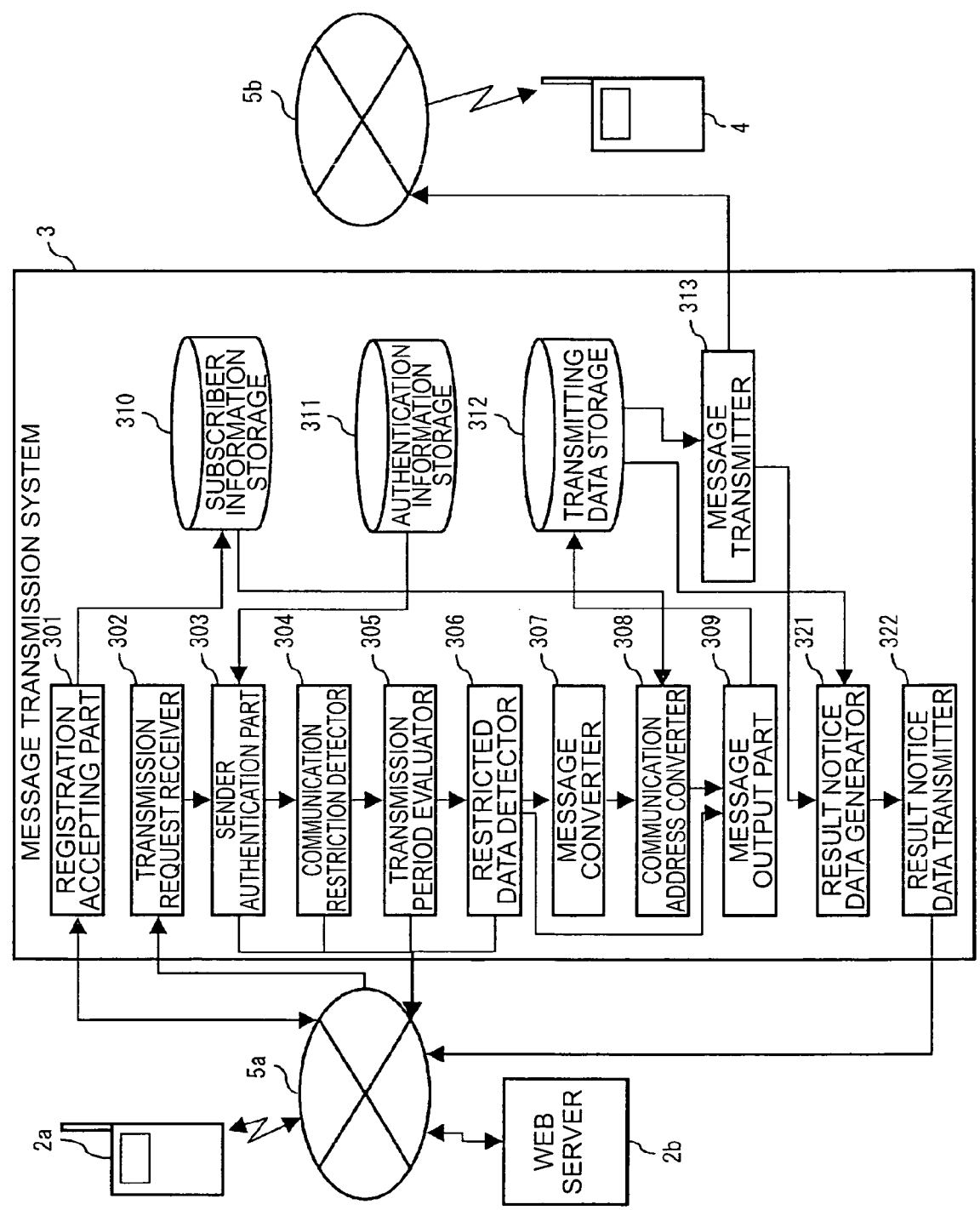
FIG. 1 is a schematic configuration diagram showing a preferred embodiment of the message transmission system according to the present invention.

An embodiment of the present invention will be described with reference to the drawings. In the drawings the same elements will be denoted by the same reference symbols, without redundant description.

FIG. 1 is a schematic configuration diagram showing a preferred embodiment of the message transmission system according to the present invention. The message transmission system 3 shown in the same drawing is a server unit (or an assembly of server units) for editing and transmitting electronic message data. The message transmission system 3 is connected to Web server 2b and communication terminal 2a through communication network 5a so as to be able to communicate with them and is also connected to communication terminal 4 through communication network 5b so as to be able to communicate with it. Each of the communication networks 5a, 5b is a communication network such as a mobile telecommunications network, a fixed-line network, a private line, an Internet network, and a combination of these communication networks. In FIG. 1, for convenience' sake of description, there are communication terminals 2a, 4 and Web server 2b one each illustrated, but the system may incorporate other communication terminals and Web servers not shown.

The Web server 2b is a server unit for delivering data for display of Web pages providing various information such as commodity information, premium point information, and account balance information to users using communication terminals. The Web server 2b also functions as a server unit (message sender equipment) used by a message sender that intends to transmit message data to communication terminal 4.

The communication terminal 2a is a communication terminal (message sender equipment) used by a message sender, and the communication terminal 4 is a communication terminal being a message destination designated by the message sender. The communication terminals 2a, 4 can be selected from a variety of communication terminals such as cell phones, PHSs (Personal Handyphone Systems), PDAs (Personal Digital Assistants), and personal computers, and are preferably the mobile telecommunications terminals such as the cell phones, PHSs, and PDAs in terms of high convenience in connection from users to communication networks 5a, 5b.

The message transmission system 3 has a function of accepting subscriber information about an information delivery service preliminarily provided by Web server 2b, from the Web server 2b or communication terminal 2a being the message sender equipment, and a function of transmitting message data to communication terminal 4 of the message destination on the basis of a request from the Web server 2b or from the communication terminal 2a. The message transmission system 3 is constructed of functional components including a registration accepting part (registration accepting means) 301, a transmission request receiver (transmission request receiving means) 302, a sender authentication part (sender authenticating means) 303, a communication restriction detector 304, a transmission period evaluator 305, a restricted data detector 306, a message converter 307, a communication address converter (communication address converting means) 308, a message output part (message outputting means) 309, a subscriber information storage (subscriber information storing means) 310, an authentication information storage (authentication information storing means) 311, a transmitting data storage 312, a message transmitter 313, a result notice data generator 321, and a result notice data transmitter 322. The components of the message transmission system 3 will be described below in detail.

The registration accepting part 301 is a part that accepts subscriber information containing a membership number (first communication terminal specifying information) specifying a communication terminal subscribing to a service provided by the Web server 2b, a subscriber telephone number (second communication terminal specifying information) of the communication terminal, and a subscribed object service ID (subscribed service specifying information) specifying a service as a subscribed object, from the Web server 2b or from the communication terminal 2a through the communication network 5a. The acceptance of subscriber information is implemented by data reception using HTTP (HyperText Transfer Protocol), by file reception using a file transfer protocol such as FTP (File Transfer Protocol), and so on. In this case, the registration accepting part 301 may be configured to act so as to permit access from the Web server 2b or from the communication terminal 2a prior to the acceptance of subscriber information, by using user authentication such as password authentication.

The registration accepting part 301 stores the subscriber telephone number, membership number, and subscribed object service ID in association with each other on the basis of the accepted subscriber information, in the subscriber information storage 310. FIG. 2 is a diagram showing a data configuration of subscriber information in the subscriber information storage 310. As shown in the same figure, for example, where the registration accepting part 301 accepts the subscriber telephone number "090-XXXX0001," membership number "MEM001," and subscribed object service ID "6789" as the subscriber information, it stores these information items as one associated record in the subscriber information storage 310.

The transmission request receiver 302 is a part that receives transmission request information containing a service provider ID specifying a message sender, a service ID (provided service specifying information) specifying a service provided by the message sender, a password (authentication information) corresponding to the service provider ID and service ID, a membership number (third communication terminal specifying information) specifying a communication terminal of a message destination, and message data to be transmitted to the message destination, from the Web server 2b or from the communication terminal 2a. For example, the transmission request receiver 302 receives message data comprised of a user ID "12345+6789" being a combination of the service provider ID with the service ID, a password "XXXX," a membership number "MEM001," a title "Site Renewal," and a body "Website is redesigned." from the Web server 2b. The transmission request receiver 302 extracts the service provider ID, service ID, password, membership number, and message from the received transmission request information and delivers them to the sender authentication part 303, restricted data detector 306, message converter 307, and communication address converter 308.

Figure 3:
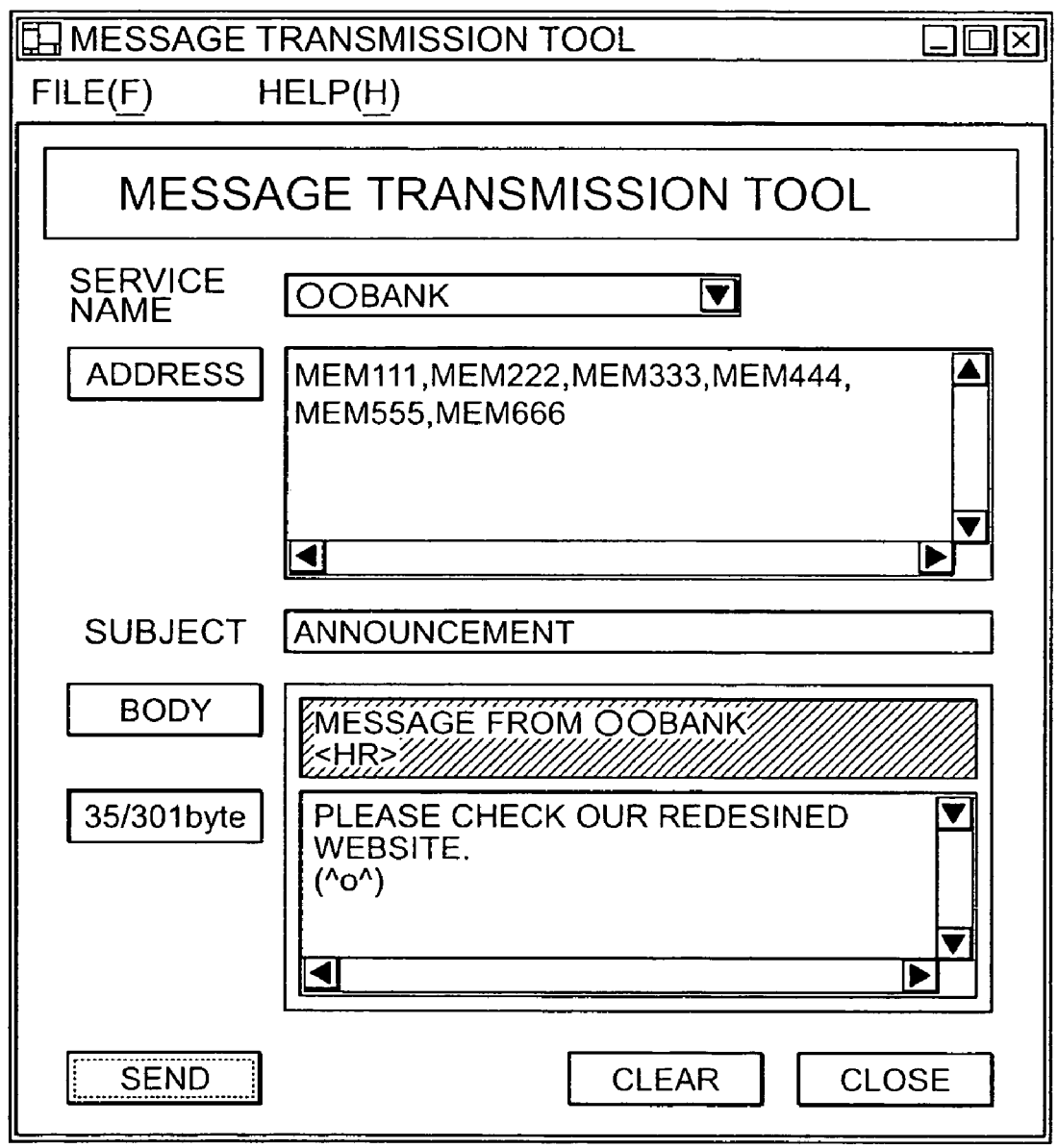
FIG. 3 is a diagram showing a screen image displayed on a Web server or a communication terminal by a transmission request receiving means shown in FIG. 1 on the occasion of receiving more than one membership number at one time.

The transmission request receiver 302 may act so as to receive more than one membership number at one time on the occasion of receiving the membership number and message data from the Web server 2b or from the communication terminal 2a. FIG. 3 shows a screen image displayed on the Web server 2b or the communication terminal 2a by the transmission request receiver 302 on this occasion. As shown in the same drawing, more than one membership number such as "MEM111", "MEM222" . . . is able to be inputted to the field "address", and text data indicating title and body is able to be inputted to the field "subject" and "body", respectively. The transmission request receiver 302 receives more than one membership number of destination to which the same message data is transmitted, from the Web server 2b or from the communication terminal 2a at one time, using a screen image like this.

The sender authentication part 303 is a part that authenticates the message sender equipment making access, based on the service provider ID, service ID, and password received from the transmission request receiver 302. More specifically, the sender authentication part 303 refers to the authentication information storage 311 on the basis of the service provider ID and service ID to retrieve the password (authentication information) corresponding to the service provider ID and service ID.

FIG. 4 shows a configuration of data stored in the authentication information storage 311. As shown in the same drawing, the authentication information storage 311 stores the service provider ID "12345" specifying the service provider of the service provided by Web server 2b, the service ID "6789" discriminating the service provided by Web server 2b, and the password (authentication information) "XXXX" set for the service ID, in association with each other.

For example, when the sender authentication part 303 receives the service provider ID and service ID "12345+ 6789," it retrieves a record including the service provider ID and service ID. Then the sender authentication part 303 determines whether the password "XXXX" in the retrieved record agrees with the password received by the transmission request receiver 302, thereby authenticating the message sender equipment. The sender authentication part 303 delivers the result "OK/NG" of the password authentication, and the record retrieved from the authentication information storage 311, to the communication restriction detector 304.

Referring back to FIG. 1, the communication restriction detector 304 is a part that, in the case of the password authentication result received from the sender authentication part 303 being "OK," detects the fact that the message transmission by the message sender is restricted, and performs a process of suspending the message transmission. Specifically, the communication restriction detector 304 extracts a transmission restriction flag 1 corresponding to the service provider ID and a transmission restriction flag 2 corresponding to the service ID (cf. FIG. 4) from the record received from the sender authentication part 303, and performs the process of suspending the message transmission when either one of the flags is on, "1." These transmission restriction flags are flags preliminarily set in the message transmission system 3 in order to restrict the message transmission in service provider units and in service units. When both of the transmission restriction flags are off, "0," the communication restriction detector 304 delivers the record received from the sender authentication part 303, to the transmission period evaluator 305.

The transmission period evaluator 305 is a part that determines whether the message transmission by the message sender is within a preset transmission period, and performs a process of suspending the message transmission if the time of the message transmission is out of the transmission period. Specifically, the transmission period evaluator 305 extracts a service start date and a service end date (cf. FIG. 4) corresponding to the service provider ID and the service ID from the record received from the communication restriction detector 304, and performs the process of suspending the message transmission when the time of reception of the transmission request information is out of the transmission period specified by the service start date and the service end date. For example, where the reception time of the transmission request information is "2004/8/31 10:00:00" and where the service start date and the service end date are "2004/9/1" and "2004/ 10/1," respectively, the transmission period evaluator 305 determines that the reception time is out of the transmission period, and performs the suspending process of message transmission. When the transmission period evaluator 305 determines that the reception time is within the transmission period, it delivers the record received from the communication restriction detector 304, to the message converter 307.

The restricted data detector 306 is a part that, when the transmission period evaluator 305 determines that the reception time of the transmission request information is within the transmission period, detects predetermined restricted object data from the message data included in the transmission request information. This restricted object data preliminarily designated is, for example, tag information containing a specific character, such as tag information containing link information to a specific Web page including character "HREF," and tag information for embedding a graphic image including character "IMG." The restricted data detector 306 controls the message output part 309 so as not to output transmitting message data (which will be detailed later) when the restricted object data is detected in the message data.

The message converter 307 is a part that converts message data included in the transmission request information, into transmitting message data in a predetermined format. Namely, the message converter 307 separates the title and body included in the message data, and edits the data by adding tag information in HTML format. The message converter 307 extracts a service name (cf. FIG. 4) corresponding to the service ID from the record received from the transmission period evaluator 305, and adds it to the message data edited as described above. Furthermore, the message converter 307 also performs a process of adding fixed tag information preliminarily registered in the message transmission system 3, to the message data. Such tag information preferably used is link information to a Web page providing information useful to users. The message converter 307 delivers the transmitting message data resulting from the conversion as described above, to the message output part 309.

The communication address converter 308 is a part that refers to the subscriber information storage 310 to convert the membership number included in the transmission request information, into a subscriber telephone number (communication address) about the communication terminal of the message destination. More specifically, the communication address converter 308 searches the subscriber information storage 310 on the basis of the service ID and membership number in the transmission request information to retrieve a record having the subscribed object service ID agreeing with the service ID and the membership number agreeing with that in the transmission request information. Then the communication address converter 308 converts the membership number into a subscriber telephone number associated with the service ID and the membership number in the retrieved record, and delivers it to the message output part 309.

In the example of FIG. 2, where the service ID "6789" and the membership number "MEM001" are included in the transmission request information, the communication address converter 308 converts the membership number into the subscriber telephone number "090-XXXX0001" corresponding to the service ID and membership number.

Referring back to FIG. 1, the message output part 309 is a part that adds the subscriber telephone number received from the communication address converter 308, as communication address information of the message destination to the transmitting message data received from the message converter 307, and outputs the resultant. In this case, the message output part 309 performs the output of transmitting message data by storing it into the transmitting data storage 312.

The message transmitter 313 is a part that transmits the transmitting message data stored in the transmitting data storage 312, to the communication terminal 4. Namely, the message transmitter 313 designates the subscriber telephone number in the transmitting message data as a communication address of the destination, and transmits the transmitting message data. In this case, the message transmitter 313 may be configured to act so as to actively transmit the transmitting message data to the communication terminal 4 by use of SMTP (Simple Mail Transfer Protocol) or the like, or may be configured to act so as to passively transmit the transmitting message data in accordance with a transmission request from the communication terminal 4 by use of HTTP or the like. Furthermore, the message transmitter 313 detects a transmission result at the time of a transmission of the transmitting message data, associates the transmission result with the transmission message data, and stores the resultant into the transmitting data storage 312. The message transmitter 313 detects a state, which shows the transmission result, such as "00(normal end)", "01(no appropriate membership number)", and "09(communication restricted)".

After the transmission of transmitting message data by the message transmitter 313, the result notice data generator 321 refers to the transmitting data storage 312 to generate message transmission result data which is provided for the Web server 2b or for the communication terminal 2a. The membership number which is a transmitted object of the message data, and the transmission result, such as "MEM111, 00," are included in the message transmission result data. More than one membership number and corresponding transmission result may be included in the message transmission result data in case that more than one membership number is an object to be transmitted. The result notice data generator 321 outputs the generated message transmission result data to the result notice data transmitter 322.

The result notice data transmitter 322 transmits the message transmission result data to the Web server 2b or to the communication terminal 2a through the communication network 5a. In this case, the result notice data transmitter 322 may act to actively transmit the message transmission result data to the Web server 2b or to the communication terminal 2a by e-mail using SMTP or the like, or may act to passively transmit the message transmission result data by using HTTP or the like in response to a transmission request from the Web server 2b or from the communication terminal 2a.

Subsequently, the operation of the message transmission system 3 according to the present embodiment will be described, together with a message transmission method according to an embodiment of the present invention.

Figure 5:
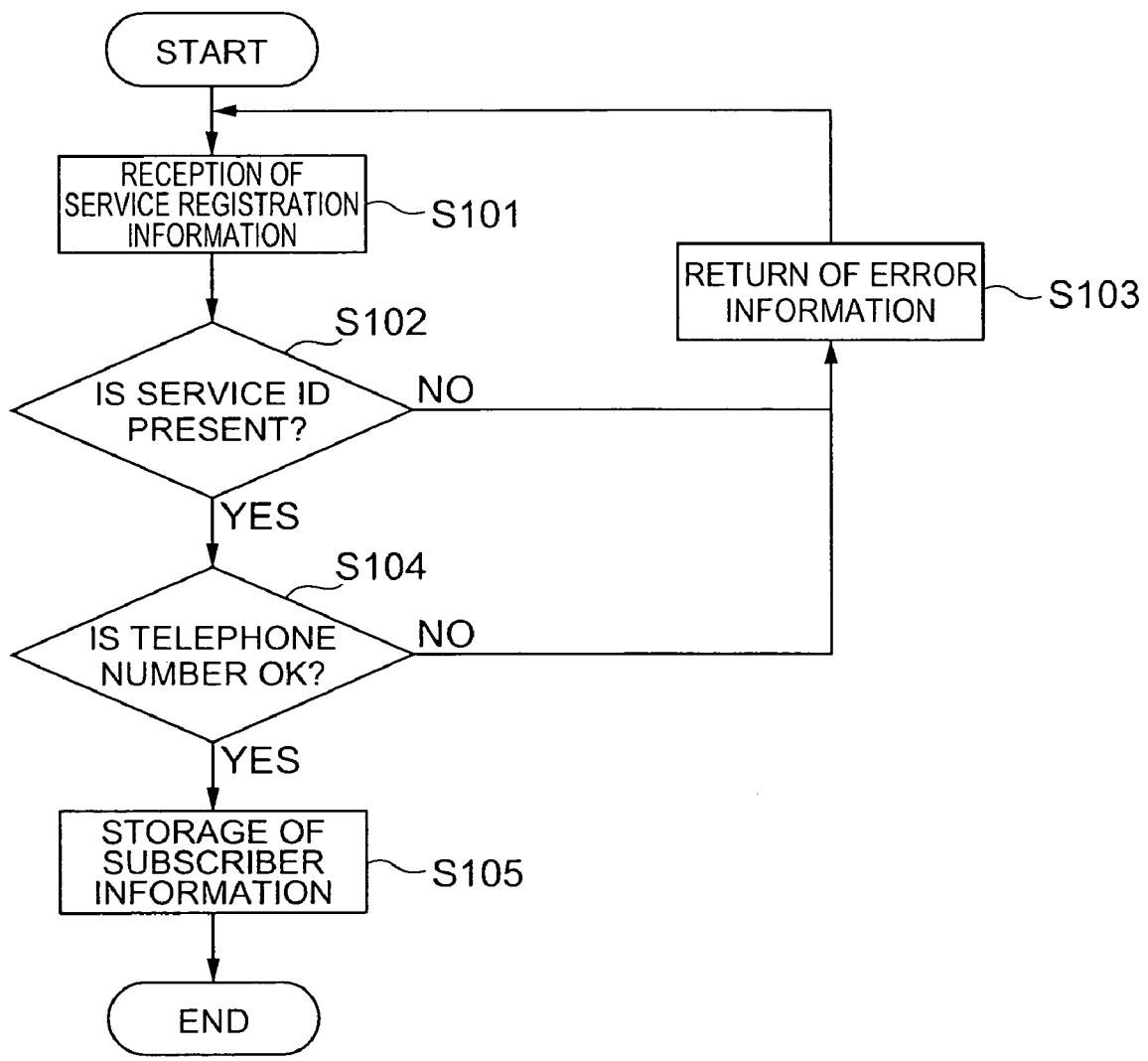
FIG. 5 is a flowchart showing an operation in storage of subscriber information in the message transmission system shown in FIG. 1.

First, the operation in the storage of the subscriber information in the message transmission system 3 will be described with reference to FIG. 5.

As shown in the same figure, first, the registration accepting part 301 receives the subscriber information containing the membership number, subscriber telephone number, and subscribed object service ID from Web server 2b or from communication terminal 2a (step S101). Then the registration accepting part 301 determines whether the received subscribed object service ID exists in the data stored in the authentication information storage 311 (step S1102).

When the result of the above determination is that the subscribed object service ID is absent (step S102; NO), error information is returned to the sender of the subscriber information (step S103), and thereafter the processing is shifted to step S101. On the other hand, when it is determined that the subscribed object service ID is present (step S102; YES), the registration accepting part 301 executes a data check process of checking the digit number of the received subscriber telephone number, data range, etc. (step S104).

When the above determination results in determining that the data of the subscriber telephone number is invalid (step S104; NO), error information is sent back to the sender of the subscriber information (step S103), and then the processing is shifted to step S101. On the other hand, when it is determined that the data of the subscriber telephone number is valid (step S104; YES), the subscriber telephone number, membership number, and subscribed object service ID included in the received subscriber information are stored in association with each other into the subscriber information storage 310 (step S105).

Figure 6:
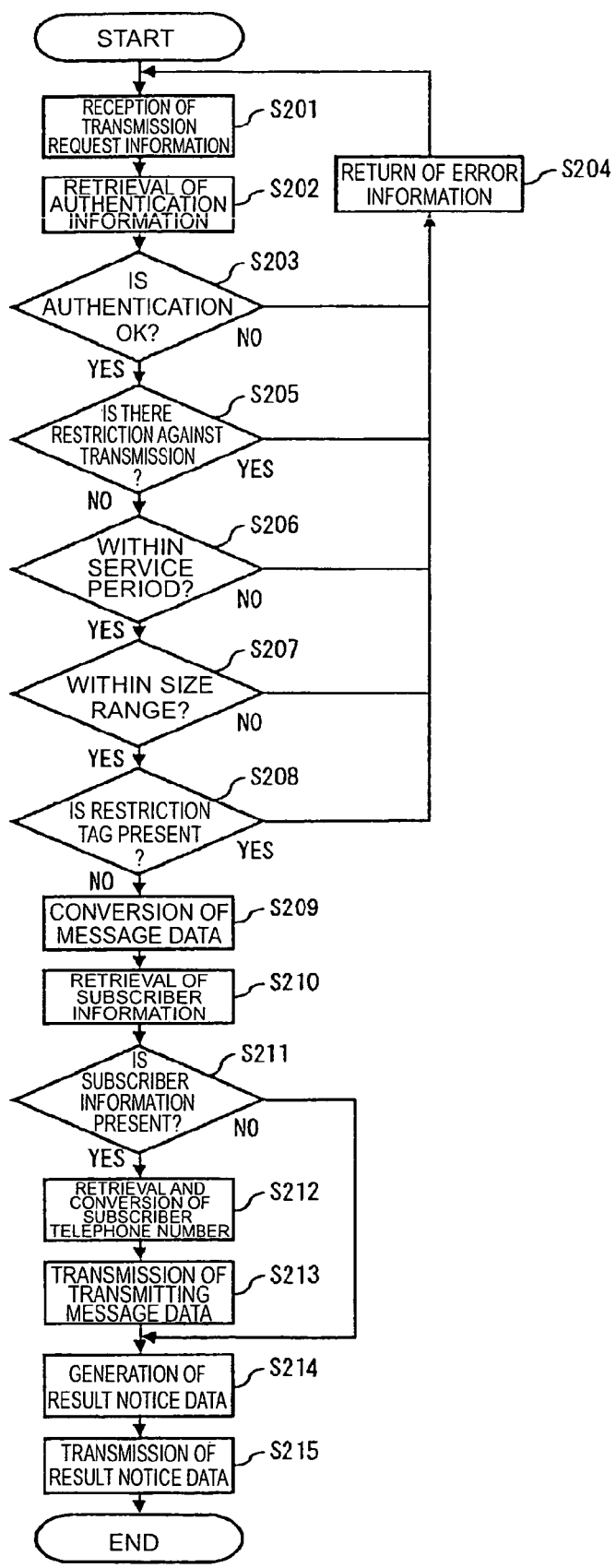
FIG. 6 is a flowchart showing an operation in message transmission in the message transmission system shown in FIG. 1.

Next, the operation in the message transmission in the message transmission system 3 will be described with reference to FIG. 6.

First, the transmission request receiver 302 of the message transmission system 3 receives the transmission request information with the message destination of communication terminal 4 from Web server 2b or from communication terminal 2a (step S201). Next, the sender authentication part 303 retrieves a record with the service provider ID and service ID agreeing with those in the transmission request information, from the authentication information storage 311 (step S202). Then the sender authentication part 303 determines whether the password stored in the retrieved record agrees with that in the transmission request information (step S203). When it is determined that the passwords do not agree (step S203; NO), the sender authentication part 303 sends error information back to Web server 2b or to communication terminal 2a being the sender of the transmission request information (step S204), and thereafter returns the processing to step S201.

When it is determined on the other hand that the passwords agree (step S203; YES), the communication restriction detector 304 refers to the record retrieved from the authentication information storage 311, thereby determining whether the message transmission by the message sender is restricted (step S205). When the result of the determination is that either the transmission restriction flag 1 or the transmission restriction flag 2 in the record is "1" (step S205; YES), the communication restriction detector 304 sends error information back to the sender of the transmission request information (step S204), and thereafter returns the processing to step S201.

On the other hand, when the transmission restriction flag 1 and the transmission restriction flag 2 are determined both to be "0" (step S205; NO), the transmission period evaluator 305 refers to the record retrieved from the authentication information storage 311, thereby determining whether the reception time of the transmission request information is within the transmission period (step S206). When it is determined that the reception time of the transmission request information is out of the transmission period (step S206; NO), the transmission period evaluator 305 sends error information back to the sender of the transmission request information (step S204), and then returns the processing to step S201.

When it is determined on the other hand that the reception time of the transmission request information is within the transmission period (step S206; YES), the restricted data detector 306 determines whether the message data in the transmission request information is not more than a predetermined data size (e.g., 500 bytes) (step S207). When it is determined is that the message data is over the predetermined data size (step S207; NO), the restricted data detector 306 sends error information back to the sender of the transmission request information (step S204), and thereafter returns the processing to step S201.

On the other hand, when the message data is determined to be not more than the predetermined data size (step S207; YES), the restricted data detector 306 further determines whether the message data contains tag information of restricted object data (step S208). When the result is that the message data contains restricted object data (step S208; YES), the restricted data detector 306 sends error information back to the sender of the transmission request information (step S204), and thereafter returns the processing to step S201, thereby controlling the message output part 309 not to output the transmitting message data.

On the other hand, when the message data contains no restricted object data (step S208; NO), the message converter 307 converts the message data into transmitting message data (step S209). In FIG. 7, (a) is a diagram showing a content of a template for the conversion process by the message converter 307, and (b) a diagram showing a content of transmitting message data resulting from the conversion by the message converter 307. The message converter 307 preliminarily retains the template for the conversion process as shown in FIG. 7 (a). This template is described including tag information in HTML format, and has an index D01 "{Subject}" for replacement with the title in the message data, an index D02 "{Service Name}" for replacement with the service name corresponding to the service ID in the transmission request information, an index D03 "{Body}" for replacement with the body in the message data, and fixed link information D04 "<A HREF="http://xxxx">." The message converter 307 applies the title and body in the message data, and the service name retrieved from the authentication information storage 311, to these portions of index D01, index D03, and index D02, thereby converting the template into the transmitting message data as shown in FIG. 7 (b).

Referring back to FIG. 6, the communication address converter 308 refers to the subscriber information storage 310 to retrieve a record with the service ID and membership number agreeing with those in the transmission request information (step S210). Then the communication address converter 308 determines whether there exists a record with the service ID and membership number agreeing with those in the transmission request information, as a result of the above retrieving process (step S211). When the result of the determination is that there is no coincident record (step S211; NO), the message transmitting process is terminated. When it is determined on the other hand that there is a coincident record (step S211; YES), the communication address converter 308 retrieves the subscriber telephone number in the pertinent record and thereafter the message output part 309 adds the subscriber telephone number to the transmitting message data and stores it into the transmitting data storage 312 (step S212).

Figure 8:
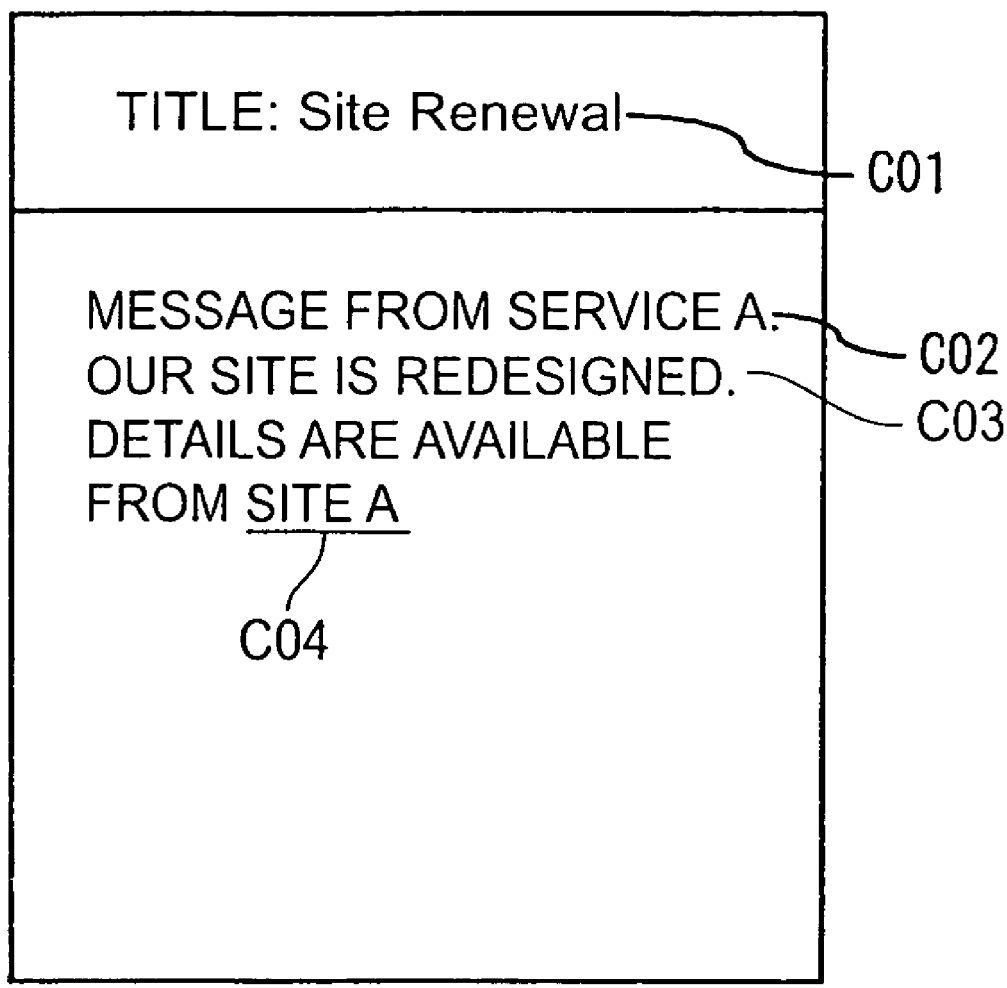
FIG. 8 is a diagram showing an example output of transmitting message data at a communication terminal of a message destination.

After that, the message transmitter 313 retrieves the transmitting message data from the transmitting data storage 312 and transmits it to the communication terminal 4 (step S213). FIG. 8 shows an example output of the transmitting message data at communication terminal 4. As shown in the same drawing, the indices D01, D02, and D03 after the replacement by the message converter 307 are outputted as character strings C01, C02, and C03, and the link information D04 fixedly added by the message converter 307 is outputted as a character string C04 with a link function.

After the transmitting message data being transmitted, the result notice data generator 321 generates the message transmission result data in which the membership number that is a transmitted object of the transmitting message data and the transmission result are included (step S214). After that, the result notice data transmitter 322 transmits the generated message transmission result data to the Web server 2b or to the communication terminal 2a, being the sender of the transmission request information, by e-mail (step S215).

The message transmission system 3 described above is configured to preliminarily accept the membership number specifying the communication terminal 4, the subscriber telephone number specifying the communication address of the communication terminal 4, and the subscribed object service ID specifying the service to which the communication terminal 4 subscribes, from Web server 2b or from communication terminal 2a on the service provider side, and to store those information items in association with each other in the subscriber information storage 310. When the membership number specifying the communication terminal of the message destination, and the service ID are received from Web server 2b or from communication terminal 2a, the subscriber telephone number corresponding to the received membership number and service ID is retrieved by referring to the subscriber information storage 310, and the message is outputted using the telephone number as a communication address of the message destination. This makes it feasible to more securely transmit the message to the communication terminal intended by the message sender, by converting the communication terminal specifying information managed for each service provided by the message sender, into the communication address, and to restrict the message destination on the sender-by-sender basis.

The password is additionally received on the occasion of receiving the message transmission request from Web server 2b or from communication terminal 2a, and the message transmission is permitted if the password agrees with the password preliminarily determined for each service; therefore, it is feasible to authenticate the message sender for each provided service and to prevent spoofing of the message sender.

Preferably, the system further comprises authentication information storing means for storing the provided service specifying information, and authentication information for authenticating the message sender equipment, in association with each other; and sender authenticating means for authenticating the message sender equipment on the basis of the authentication information; the transmission request receiving means additionally receives the authentication information from the message sender equipment; the sender authenticating means refers to the authentication information storing means on the basis of the provided service specifying information received by the transmission request receiving means, to retrieve the authentication information corresponding to the provided service specifying information, thereafter determines whether the authentication information agrees with the authentication information received by the transmission request receiving means, and thereby authenticates the message sender equipment; the message outputting means outputs the predetermined message when the sender authenticating means authenticates the message sender equipment.

In this case, the authentication information is additionally received on the occasion of receiving the message transmission request from the message sender equipment, and the authentication information permits the message transmission when it agrees with the authentication information preliminarily determined for each service; therefore, it is feasible to authenticate the message sender for each provided service and to prevent spoofing of the message sender.

The present invention is by no means limited to the above embodiment. For example, the means for authenticating the message sender equipment is not limited to the password authentication, but may be any other authenticating means such as voice authentication or fingerprint authentication.

Figure 9:
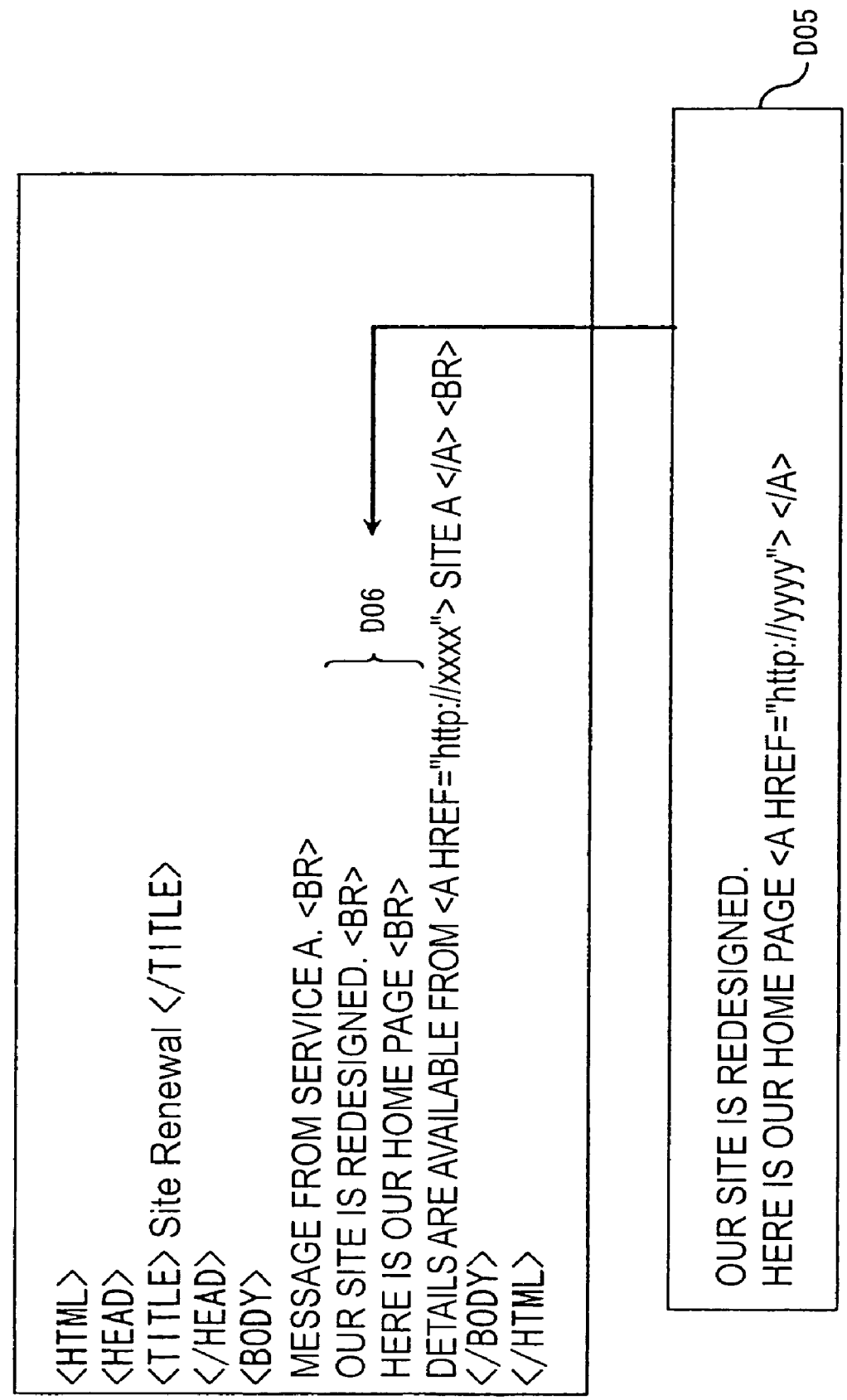
FIG. 9 is a diagram showing a modification example of transmitting message data resulting from conversion by the message converter shown in FIG. 1.

The restricted data detector 306 of the message transmission system 3 performs the control not to transmit the transmitting message data with detection of restricted object data, but it may be configured to control the message converter 307 to filter the message data by deleting the restricted object data in case of a detection of restricted object data such as tag information. In this case, for example, the message converter 307 deletes the tag information including a specific character such as the character "HREF," from the body in the message data, and thereafter applies the body to the template to convert it into transmitting message data. FIG. 9 shows a modification example of transmitting message data resulting from the conversion by the message converter 307. As shown in the same drawing, the message converter 307 deletes link information "<A HREF="http://yyyy">" corresponding to the restricted object data from the data D05 of the body included in the message data received from the message transmitter side, to convert the data D05 into the data D06, thereby generating the transmitting message data.

The message transmission system 3 is configured to convert the message data into data in HTML format and transfer it, but the data format is not limited to specific formats; for example, the system may be configured to act so as to convert the message data into another data format such as the text data format.

The message transmission system 3 is configured to store the transmitting message data into the transmitting data storage 312 and then transmit it to the communication terminal 4, but the system may also be configured to act so as to transfer the data to the communication terminal via another computer system such as a mail server.

INDUSTRIAL APPLICABILITY

The present invention is intended for a message transfer system and message transfer method transmitting a message through a communication network, and securely transmits a message to an address designated by a sender, and restricts a message destination on a sender-by-sender basis.

The invention claimed is:

1. A message transmission system comprising:
a registration accepting unit for accepting first communication terminal specifying information specifying a communication terminal, second communication terminal specifying information specifying a communication address of the communication terminal, and subscribed service specifying information specifying a service to which the communication terminal subscribes;
a subscriber information storing unit for storing the first communication terminal specifying information, the second communication terminal specifying information, and the subscribed service specifying information in association with each other;
a transmission request receiving unit for receiving third communication terminal specifying information specifying a communication terminal of a message destination, and provided service specifying information specifying a service provided by a message sender, from a message sender equipment;
a communication address converting unit for referring to the subscriber information storing unit on the basis of the third communication terminal specifying information and the provided service specifying information received by the transmission request receiving unit, to retrieve the second communication terminal specifying information corresponding to the first communication terminal specifying information agreeing with the third communication terminal specifying information, and the subscribed service specifying information agreeing with the provided service specifying information; and
a message outputting unit for outputting a predetermined message while designating the second communication terminal specifying information retrieved by the communication address converting unit, as a communication address.

2. The message transmission system according to claim 1, further comprising:
an authentication information storing unit for storing the provided service specifying information, and authentication information for authenticating the message sender equipment, in association with each other; and
a sender authenticating unit for authenticating the message sender equipment on the basis of the authentication information,
wherein the transmission request receiving unit additionally receives the authentication information from the message sender equipment,
wherein the sender authenticating unit refers to the authentication information storing unit on the basis of the provided service specifying information received by the transmission request receiving unit, to retrieve the authentication information corresponding to the provided service specifying information, thereafter determines whether the authentication information agrees with the authentication information received by the transmission request receiving unit, and thereby authenticates the message sender equipment, and
wherein the message outputting unit outputs the predetermined message when the sender authenticating unit authenticates the message sender equipment.

3. A message transmission method comprising:

a registration accepting step wherein a registration accepting unit accepts first communication terminal specifying information specifying a communication terminal, second communication terminal specifying information specifying a communication address of the communication terminal, and subscribed service specifying information specifying a service to which the communication terminal subscribes;

a subscriber information storing step wherein a subscriber information storing unit stores the first communication terminal specifying information, the second communication terminal specifying information, and the subscribed service specifying information in association with each other;

a transmission request receiving step wherein a transmission request receiving unit receives third communication terminal specifying information specifying a communication terminal of a message destination, and provided service specifying information specifying a service provided by a message sender, from a message sender equipment;

a communication address converting step wherein a communication address converting unit refers to the subscriber information storing unit on the basis of the third communication terminal specifying information and the provided service specifying information received by the transmission request receiving unit, to retrieve the second communication terminal specifying information corresponding to the first communication terminal specifying information agreeing with the third communication terminal specifying information, and the subscribed service specifying information agreeing with the provided service specifying information; and a message outputting step wherein a message outputting unit outputs a predetermined message while designating the second communication terminal specifying information retrieved by the communication address converting unit, as a communication address.

* * * * *